Inventor:
John C. Curtis

Dec. 17, 1940.   J. C. CURTIS   2,224,861
PRESSURE FLUID MOTOR
Filed Jan. 26, 1940   4 Sheets-Sheet 2
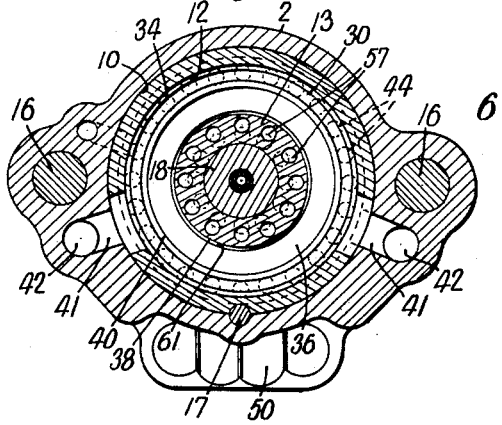
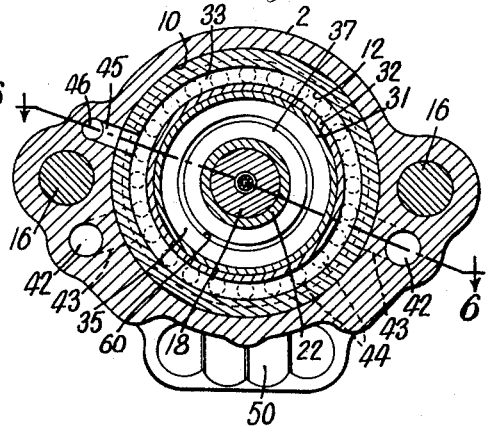
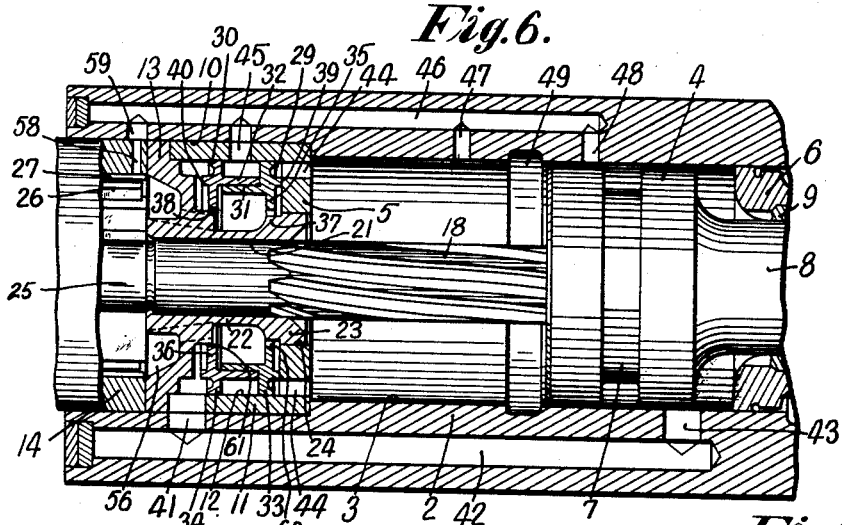
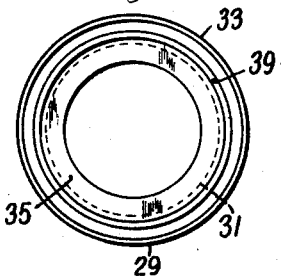
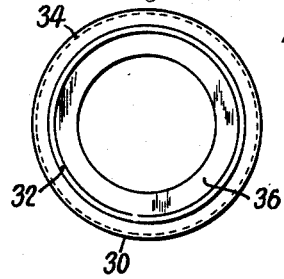
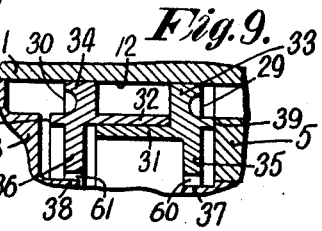
Inventor:
John C. Curtis
by Amis A. Maxom
atty.

Dec. 17, 1940.  J. C. CURTIS  2,224,861
PRESSURE FLUID MOTOR
Filed Jan. 26, 1940  4 Sheets-Sheet 3
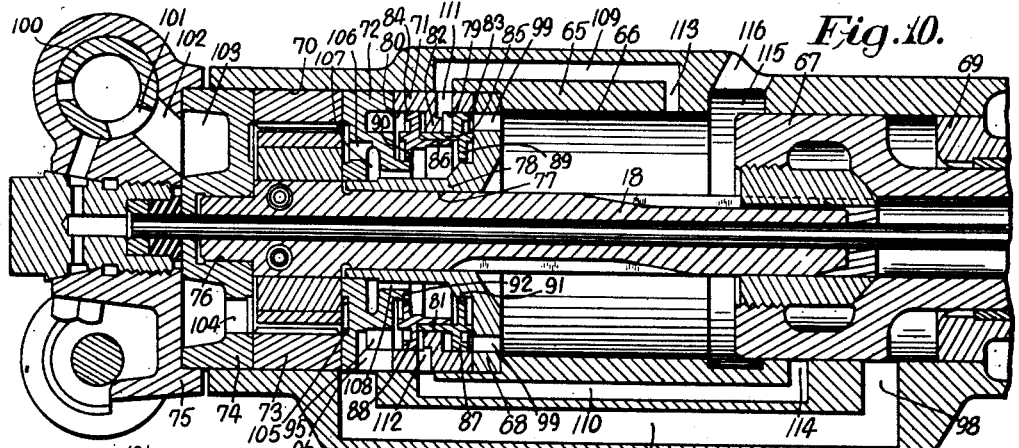
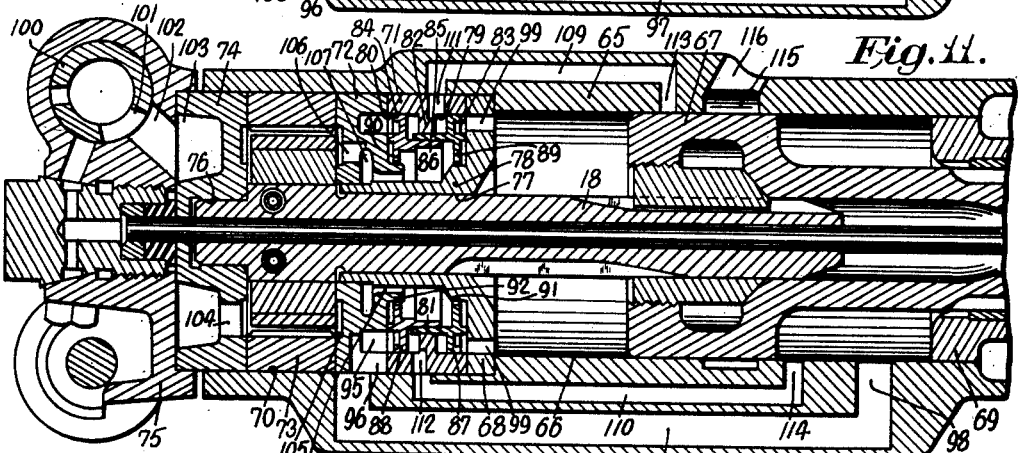
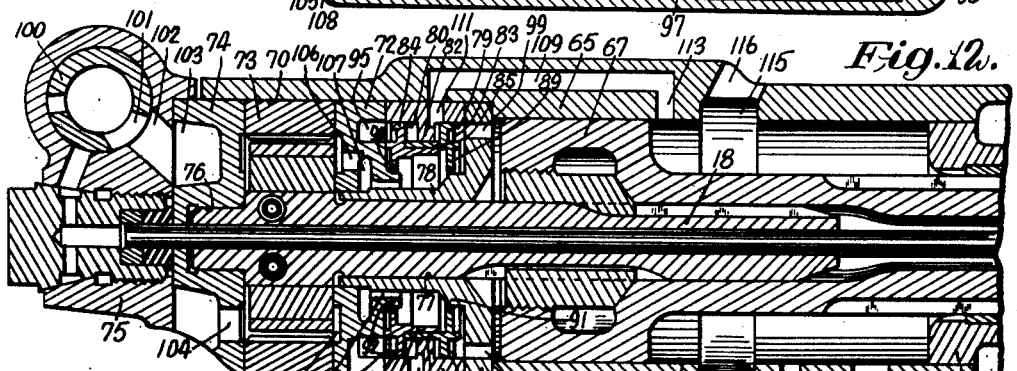
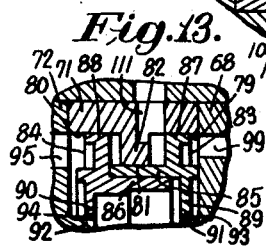
Inventor:
John C. Curtis.
by Louis A. Maxson.
Atty.

Dec. 17, 1940.     J. C. CURTIS     2,224,861
PRESSURE FLUID MOTOR
Filed Jan. 26, 1940     4 Sheets-Sheet 4
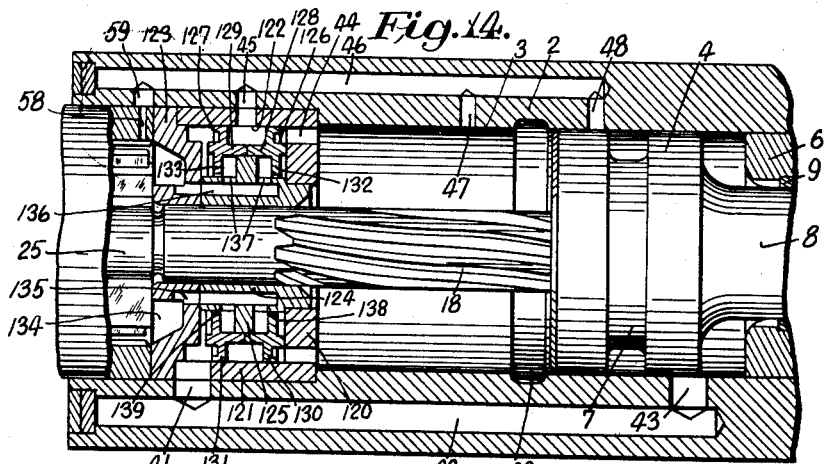
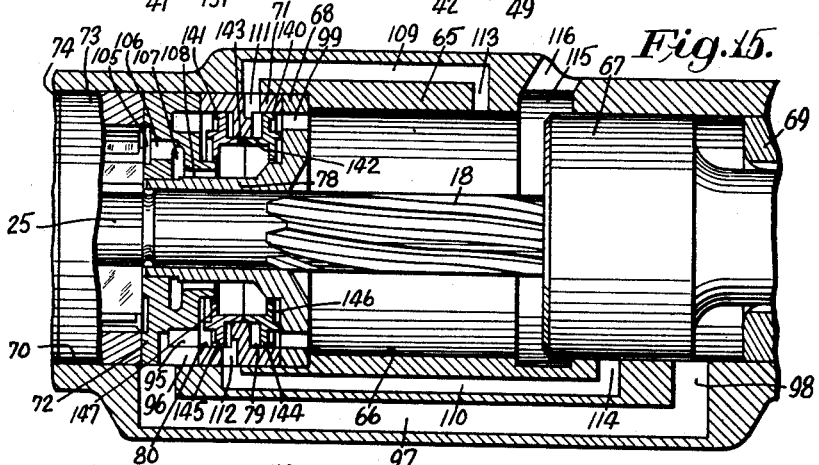
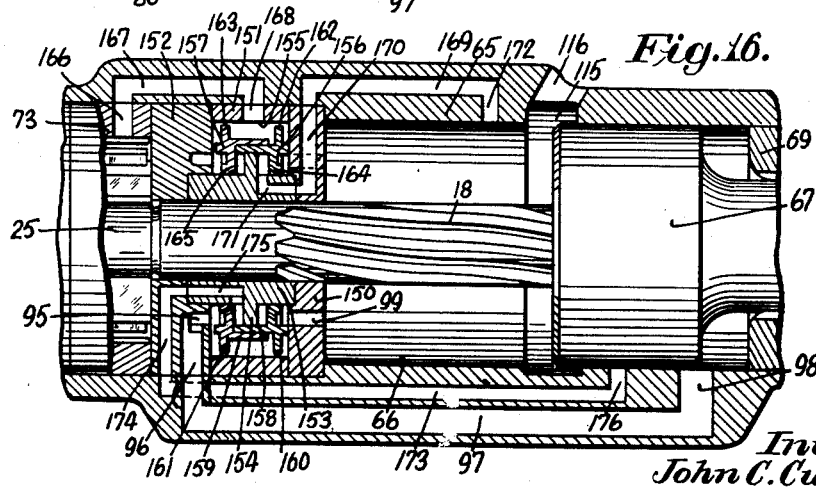
Inventor.
John C. Curtis.
by
Louis A. Maxson,
Atty.

UNITED STATES PATENT OFFICE 2,224,861

PRESSURE FLUID MOTOR

John C. Curtis, Claremont, N. H., assignor to Sullivan Machinery Company, a corporation of Massachusetts Application January 26, 1940, Serial No. 315,786

26 Claims. (Cl. 121—19)

This invention relates to pressure fluid motors, and more particularly to improvements in pressure fluid motors of the reciprocating piston, hammer type especially designed for use in hammer rock drills.

An object of this invention is to provide an improved pressure fluid motor. Another object is to provide an improved pressure fluid motor having improved fluid distribution means whereby pressure fluid may be distributed to the motor cylinder passages in a novel and improved manner. A further object is to provide an improved fluid distributing valve means and associated flow passage arrangement whereby the pressure fluid is distributed to the motor cylinder passages in an improved manner. A still further object is to provide an improved fluid distributing valve means embodying cooperating relatively movable, fluid actuated, fluid distributing valves for controlling the flow of pressure fluid to the motor cylinder, the valves being of a novel design and having like operating functions permitting interchangeability whereby the valves may be interchanged without affecting the proper functioning thereof. A still further object is to provide an improved fluid distributing valve means embodying a pair of cooperating, relatively movable, fluid distributing valves arranged in telescopic relation and movable into abutting engagement. Still another object is to provide a novel valve means having improved valve-throwing means associated therewith whereby the valves are controlled in an effective manner. Yet another object is to provide an improved valve means of the multi-valve type for controlling the flow of motive fluid to the hammer motor cylinder whereby the speed of operation and efficiency of the motor are greatly improved and a more powerful hammer blow is attained. These and other objects and advantages of the invention will, however, hereinafter more fully appear in the course of the following description.

In the accompanying drawings there are shown for purposes of illustration several forms which the invention may assume in practice.

In these drawings:

Fig. 4 is a cross sectional view taken substantially on line 4—4 of Fig. 1.

Fig. 5 is a cross sectional view taken substantially on line 5—5 of Fig. 1.

Fig. 6 is a longitudinal axial sectional view, with parts shown in elevation, taken in the plane of line 6—6 of Fig. 5.

Fig. 7 is a front end elevational view of the front valve.

Fig. 8 is a front end elevational view of the rear valve.

Fig. 9 is an enlarged fragmentary sectional view taken in the plane of Fig. 1, showing the distributing valves.

Fig. 10 is a longitudinal vertical sectional view, with parts broken away, through a rock drill hammer motor, illustrating another embodiment of the invention.

Figs. 11 and 12 are views similar to Fig. 10, showing the fluid distributing valves and motor piston in different operating positions.

Fig. 13 is an enlarged fragmentary sectional view taken in the plane of Fig. 10, showing the fluid distributing valves.

Fig. 14 is a view in longitudinal vertical section, with parts broken away, taken through a rock drill hammer motor, illustrating still another embodiment of the invention.

Fig. 15 is a view similar to Fig. 14, illustrating still another embodiment of the invention.

Fig. 16 is a view similar to Fig. 14, illustrating still another embodiment of the invention.

Figure 1:
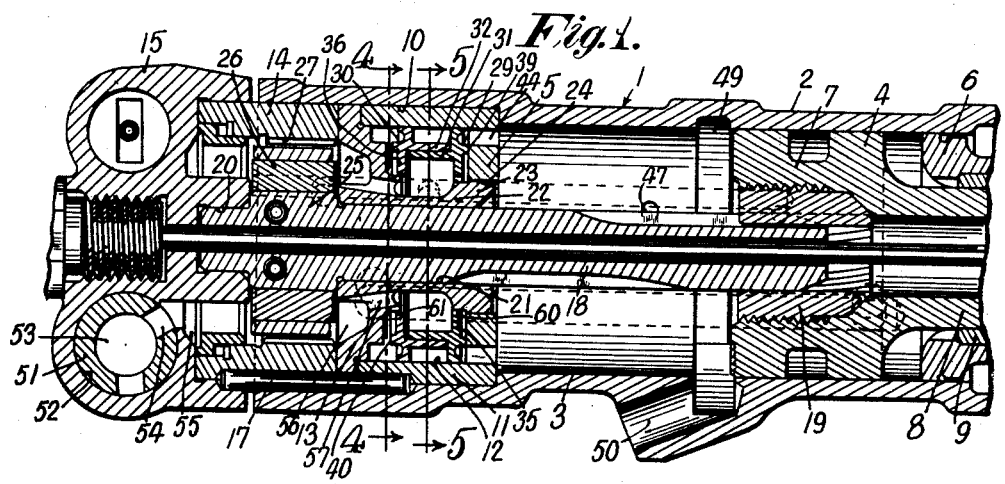
Fig. 1 is a view in longitudinal vertical section, with parts broken away, through a rock drill hammer motor, illustrating one embodiment of the invention.
Figure 2:
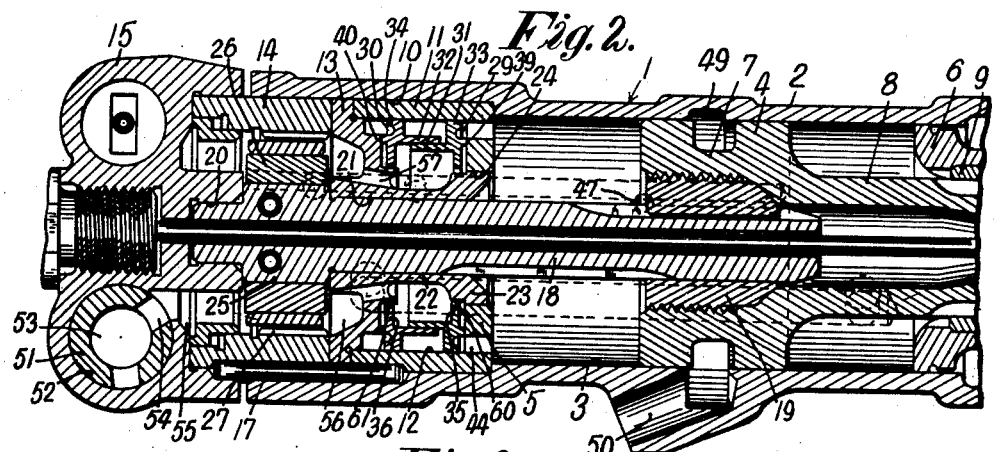
Figs. 2 and 3 are views similar to Fig. 1, showing the fluid distributing valves and motor piston in different operating positions.
Figure 3:
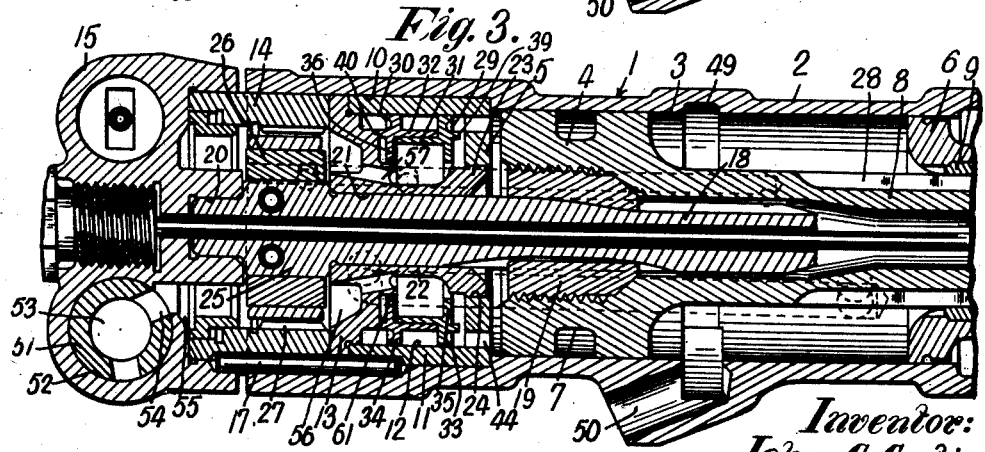

In all of the several illustrative embodiments of the invention the improved pressure fluid motor is shown embodied in a hammer rock drill, although it will be evident that the improved motor may be embodied in various types of mechanisms.

In the illustrative embodiment of the invention shown in Figs. 1 to 9, inclusive, I generally designates a hammer rock drill including a motor cylinder 2 having a bore 3 containing a reciprocatory hammer piston 4. The motor cylinder has a rear head 5 and a front head 6, and the hammer piston has a piston head 7 fitting the cylinder bore and a forward striking bar 8 guided in the bore of a sleeve 9 secured within the front motor head. In this instance, the piston striking bar of the hammer motor piston is adapted to deliver impact blows to the shank of a usual rock drill steel. Also formed in the motor cylinder and arranged in axial alinement with the cylinder bore at the rear end of the latter is an enlarged bore 10, and the rear cylinder head 5 is of cylindric shape to fit the bore 10 within which it is received. Formed integral with the rear cylinder head is a valve box 11 having a bore 12 closed at its rear side by a valve box cover 13, the latter also being of cylindric shape to fit the bore 10. Also fitting the bore 10 at the rear end of the valve box cover and abutting the latter, is a cylindric member 14. Engaging the member 14 is a rear head block 15 secured to the motor cylinder as by usual tie bolts 16, and this head block acts, through the member 14, to clamp the parts 5, 11 and 13 in position within the bore 10. A dowel pin 17 fitted within grooves in the parts 11, 13 and 14 and in the rear head block and the cylinder, holds the parts against rotation with respect to the cylinder.

In hammer rock drills of the type disclosed, means is usually associated with and operated by the hammer piston 4 for rotating the drill steel as the latter is percussively actuated by the hammer piston. Such means usually comprises a rifle bar 18 having helical vanes slidingly interlocked with the helical vanes of a rifle nut 19 threadedly secured within the hammer piston. The rifle bar is rotatably mounted at its rear end in a bore 20 formed in the rear head block and at its intermediate portion in a bore 21 formed in a sleevelike extension 22 integral with the valve box cover 13. This sleevelike extension has a front circular portion 23 tightly fitted within a bore 24 in the rear cylinder head 5. Integral with the rifle bar is a pawl carrier 25 carrying the usual spring-pressed pawls 26 engageable with internal ratchet teeth 27 formed on the member 14, which is herein a ratchet ring. The pawls 26 slip over the ratchet teeth 27 to permit the rifle bar 18 to rotate when the hammer piston moves forwardly to cause its striking bar 8 to strike a blow on the drill steel shank, and upon return movement of the hammer piston, the pawls engage the ratchet teeth to hold the rifle bar against rotation, thereby causing the hammer piston to rotate. The rotary motion of the hammer piston is transmitted to the drill steel through straight grooves 28 on the piston striking bar 8, slidingly engaging straight vanes formed on a chuck nut secured within a chuck sleeve which receives and supports the drill steel shank in the manner well known to those skilled in the art. Since the particular chuck structure and the drill steel rotation means do not per se enter into this invention, further description is herein unnecessary.

The novel valve means shown in Figs. 1 to 9, inclusive, constitutes an improvement over that disclosed and claimed in my copending application Serial No. 152,609, filed July 8, 1937. Referring to the specific structure of the valve means, it will be observed that the walls of the valve box bore 12 and the outer surface of the extension sleeve 22 provide the inner and outer walls of a valve chamber, and the rear cylinder head 5 and valve box cover 13 provide the end walls of the valve chamber. Reciprocably mounted in the valve chamber is a pair of cooperating, relatively reciprocable, fluid actuated, fluid distributing valves 29 and 30. These valves respectively control the flow of pressure fluid to the ends of the cylinder bore and are herein of the annular sleeve type movable into abutting relation and having sleevelike body portions 31 and 32, respectively, arranged in sliding telescopic relation. The valves are substantially identical in design with the exception that the sleevelike body portion of one is of smaller external diameter than the internal diameter of the other so that the smaller portion slidingly fits within the larger portion, in the manner shown. Thus, it is possible to interchange the valves within the valve chamber without affecting the proper functioning thereof, so that upon assembling of the valves inadvertent placing of the valves in the wrong end-for-end position is impossible. The valves have external annular flanges 33 and 34 respectively, fitting the valve box bore 12, and inwardly directed annular flanges 35 and 36 respectively, the flange 35 cooperating as hereinafter described with an external cylindric portion 37 integral with the extension 22, and the flange 36 cooperating with an external cylindric portion 38 integral with the valve box cover 13. The minimum radial dimensions of the valves—the diameters of the bores surrounded by the annular flanges 35 and 36—are like to each other. The internal flanges 35 and 36 and the cylindric portions 37 and 38 cooperate to provide restricted or metered flow of pressure fluid to the ends of the motor cylinder bore. The remote end faces of the sleevelike body portions 31 and 32 of the valves provide annular end-seating surfaces 39 and 40, respectively, the former being adapted to seat against the rear face of the rear cylinder head 5 and the latter against the front face of the valve box cover 13. The rear valve 30 controls admission and cut-off for the front end of the motor cylinder bore and the front valve 29 like functions for the rear end of the motor cylinder bore. The valve box bore 12 at the rearward side of the rear valve 30 is connected through ports 41 (see Fig. 6) with distributing passages 42, the latter in turn being connected through ports 43 with the forward end of the cylinder bore. The valve box bore 12 at the forward side of the front valve 29 is connected by a series of passages 44 formed in the rear cylinder head 5, with the rear end of the cylinder bore. Communicating with the valve box bore 12 intermediate the external valve flanges 33 and 34 through a port 45 (see Fig. 6) is a valve-throwing passage 46, the latter in turn communicating with the cylinder bore through longitudinally spaced ports 47 and 48. Formed in the walls of the cylinder bore substantially midway between the ends of the cylinder and between the ports 47 and 48 is an annular exhaust groove 49 connected directly to atmosphere through an exhaust port 50.

The means for supplying pressure fluid to the valve chamber comprises a throttle valve 51 arranged in a transverse bore 52 formed in the rear head block 15. The throttle valve is provided with an internal fluid supply chamber 53 connectible through a port 54 with a chamber 55 formed in the front face of the rear head block. Formed in the valve box cover is an annular recess 56 connectible through the bore of the ratchet ring 14 with the chamber 55, the pressure fluid flowing from the chamber 55 through the spaces between the ratchet teeth to the recess 56. The recess 56 is connected, through a series of passages 57 formed in the valve box cover, with the valve chamber, internally within the valves 29, 30. As shown in Fig. 6, the throwing passage 46 is connected with the pressure fluid supply space within the ratchet ring through a restricted passage 58 and a port 59, so that when pressure fluid is flowing to the valve chamber, there is a continuous restricted flow of pressure fluid through the passage 58 and port 59 to the throwing passage 46, for a purpose to be later explained. As above indicated, pressure fluid may flow from within the internal chamber within the valve elements past restricted clearance spaces 60 and 61 at the inner edges of the internal valve flanges 35 and 36, respectively, to provide metering of the fluid flowing past these internal valve flanges so that the flow of pressure fluid to the supply passages is always maintained constant irrespective of any wear of the valves, the valves being guided solely at the exterior peripheries of the external valve flanges 33 and 34 which slidingly fit the bore 12 in the valve box.

The mode of operation of the improved pressure fluid motor of the embodiment of the invention above described will be clearly apparent from the description given. When the valves 29 and 30 are in the position shown in Fig. 1, pressure fluid may flow from the supply chamber within the valves, through the restricted clearance space 61, through the valve box bore 12 past the rear face of the rear valve 30, and through ports 41, passages 42 and ports 43 to the front end of the cylinder bore at the forward side of the motor piston head, the pressure fluid acting on the forward pressure area of the piston head to move the piston rearwardly to effect its return stroke. Concurrently, the rear end of the cylinder bore at the rear side of the piston head is connected to exhaust through the exhaust groove 49 and exhaust passage 50. The rear valve 30 is at this time held in its forward position by the pressure fluid acting on the effective rear pressure area of the valve, and the latter, due to its abutting relation with the front valve 29, holds the front valve in its closed position against the rear face of the rear cylinder head 5. As the motor piston moves rearwardly from the position shown in Figs. 1 and 6, the leading edge of the piston head first overruns the exhaust groove 49, thereby cutting off communication of the rear end of the cylinder bore with the exhaust, and upon continued rearward piston movement, the leading edge of the piston head overruns the port 47 and thereafter the following edge of the piston head uncovers the port 48 of the throwing passage 46, admitting pressure fluid from the front end of the cylinder bore through the throwing passage and port 45 to the annular space between the external flanges 33 and 34 of the valves. Due to the restriction at 61 between the internal pressure chamber within the valves and the valve box bore 12 at the rear side of the rear valve 30 and the relatively free flow of fluid from the rear end of the valve box bore to the front end of the cylinder bore through the passages 42, the pressure of the fluid at the forward side of the internal valve flange 36 is substantially greater than that in the valve box bore at the rear side of the rear valve 30, so that when throwing pressure is admitted to the annular space between the external valve flanges the effective pressure acting on the external flange of the rear valve 30 is sufficient to throw the rear valve rearwardly from the position shown in Figs. 1 and 6 to the position shown in Fig. 2. When the rear valve 30 is in its rearmost position shown in Fig. 2, the annular seating surface 40 thereof is seated against the front face of the valve box cover 13 while the front valve 29 is maintained seated against the rear face of the rear cylinder head. The front valve is maintained in its forward closed position by the pressure of the fluid in the annular space between the external valve flanges due to the fact that the pressure in the outer portion of the valve box bore at the front side of the front valve is at that time relatively low and the substantially equal opposed pressure areas on the forward side of the internal valve flange 35 and cumulatively on the rearward side of said flange and at the end of sleeve 31, are balanced, so that the effective pressure tending to move the valve forwardly is substantially greater than the effective pressure tending to move the valve rearwardly. Accordingly, when the valves are in the position shown in Fig. 2, flow of pressure fluid to the motor cylinder is momentarily completely cut off, and as the motor piston continues to move rearwardly by momentum the fluid trapped within the rear end of the cylinder bore is compressed by the rearwardly moving motor piston, and when the following edge of the piston head uncovers the exhaust groove 49, the fluid trapped in the annular space between the external valve flanges 33 and 34 is vented to exhaust, through port 45, passage 46 and port 48 and the cylinder bore, and the compression pressure built up within the rear end of the cylinder bore acts on the effective front pressure area of the external valve flange 33 of the front valve 29 to throw the latter rearwardly from the position shown in Fig. 2 to its position shown in Fig. 3 wherein the front valve abuttingly engages the rear valve. When the parts are in the position shown in Fig. 3, pressure fluid may flow from the supply chamber within the valves 29 and 30 through the restricted clearance space 60, through the valve box bore 12 past the front face of the front valve 29, and through the passages 44 to the rear end of the cylinder bore at the rear side of the piston head. Concurrently, the front end of the cylinder at the front side of the piston head is connected to exhaust through the exhaust groove 49 and exhaust port 50. The pressure fluid flowing past the front valve face holds the front valve 29 in its rearmost position in abutting engagement with the rear valve 30 and thereby maintains the rear valve in seated position against the front face of the valve box cover 13. Pressure fluid flowing through passages 44 to the rear end of the cylinder bore acts on the rear pressure area of the piston head to move the motor piston forwardly to effect its working stroke, i. e., to cause its striking bar 8 to deliver an impact blow to the drill steel shank. As the motor piston moves forwardly from the position shown in Fig. 3, the leading edge of the piston head first overruns the exhaust groove 49, cutting off communication of the forward end of the cylinder bore with exhaust, and upon continued forward piston movement the leading edge of the piston head overruns the port 48 of the throwing passage 46, and the following edge of the piston head thereafter uncovers the port 47 of the throwing passage 46, admitting pressure fluid from the rear end of the cylinder bore through the throwing passage and port 45 to the annular space between the external flanges 33 and 34 of the valves. Due to the restriction at 60 between the internal pressure chamber within the valves and the valve box bore 12 at the forward side of the front valve 29 and the relatively free flow of fluid from the front end of the valve box bore to the rear end of the cylinder bore through the passages 44, the pressure of the fluid at the rear side of the internal valve flange 35 is substantially greater than that in the valve box bore at the front side of the front valve 29, so that when throwing pressure is admitted to the annular space between the external valve flanges, the effective pressure acting on the external valve flange of the front valve 29 is sufficient to throw the front valve forwardly from the position shown in Fig. 3 to the position shown in Fig. 2. When the front valve 29 is in its foremost position shown in Fig. 2, the annular seating surface 39 thereon is seated against the rear face of the rear cylinder head 5 while the rear valve is maintained seated against the front face of the valve box cover 13. The rear valve 30 is maintained in its rearward closed position by the pressure of the fluid in the annular space between the external valve flanges due to the fact that the pressure in the valve box bore at the rear side of the rear valve is at that time relatively low and the relatively equal opposed pressure areas on the opposite sides of the internal valve flange 36 are balanced, so that the effective pressure tending to move the valve rearwardly is substantially greater than the effective pressure tending to move the valve forwardly. Accordingly, when the valves are in the position shown in Fig. 2, flow of pressure fluid to both ends of the cylinder bore is momentarily completely cut off and forward movement of the motor piston continues under the expansive action of the pressure fluid within the rear end of the cylinder bore and momentum. The pressure fluid trapped within the forward end of the cylinder bore is compressed by the piston, and when the following edge of the piston head uncovers the exhaust groove 49 the pressure fluid trapped in the annular space between the external valve flanges 33, 34 is vented to exhaust. The compression pressure built up by the motor piston within the front end of the cylinder bore then acts through ports 43, passages 42 and ports 41 on the effective rear pressure area of the external flange 34 of the rear valve 30 to throw immediately the latter from the position shown in Fig. 2 to its position shown in Fig. 1; and as a result pressure fluid is again admitted to the front end of the cylinder bore and the cycle of operations above described is repeated.

It will be evident that by the provision of the separate relatively movable, fluid distributing valves and the particular valve throwing means, the motor piston will substantially complete its full working stroke prior to the admission of motive fluid to the front end of the cylinder bore at the front side of the piston head, and accordingly, a largely unimpeded blow will be struck on the drill steel shank, a much less unimpeded blow than would be possible with any construction using but a single fluid distributing valve, such single valve constructions permitting but little time between cut-off at the rear end of the cylinder bore and admission to the front end of the cylinder bore. It will further be noted that the throwing of the distributing valves is effected in an opening direction by compression pressure upon the venting of the pressure from the annular space between the external flanges of the two valves and that the closing movements of the valves are effected by pressure admitted to the annular space between such external valve flanges, from the cylinder bore, such closing movements of the valves being facilitated by the fact that the relatively free flow of pressure fluid to the cylinder bore from the chamber within the valves beyond the restricted clearance spaces 60 and 61 results in less strong pressures holding the valves in open position than would exist were the so-called metering or restriction in flow, so-to-speak, not provided. The pressure fluid passing through the restricted leak passage 58 and port 59 to the throwing passage 46 enables quicker throwing of the valves, since such restricted flow partially builds up the pressure in the throwing passage and the annular space between the external valve flanges prior to the admission of cylinder pressure to bring about throwing of the valves, so that when the throwing passage is connected to the cylinder bore, an adequate throwing pressure may build up more quickly in the throwing passage and cause throwing of the valves without the delay incident to the complete filling of the throwing passage by the fluid admitted from the cylinder bore. It will be noted that precise timing can thus more surely be obtained, and greater sharpness of valve throwing also effected. The restricted leak passage 58 also at times serves as a means for preventing stalling of the motor when the load on the drill steel rotation mechanism becomes relatively high. For instance, suppose air were turned on the motor with the motor piston in front end position and the valves in the position of Fig. 1, and that the steel was so stuck that resistance to rotation would be very great. The piston might move backward, then, far enough to close both of ports 47 and 48 and the exhaust groove, and to begin to connect the front end of the cylinder through the grooves in the striking bar to the chuck, with the result that the rearwardly acting pressure would be diminished and become ineffective to complete rearward piston movement. Now, if the piston tended to stall at this point, and the port 58 were lacking, the motor might not start. But, noting that there will be some pressure behind the piston, and that the piston can move forwardly without having to turn the steel, it will be seen that if pressure builds up in the passage 46, the rearward valve may be closed and the piston can again move down to the position shown in Fig. 6, and cause the rear valve 30 to reopen, and the motor thus to operate with short strokes, rearwardly under live fluid and forwardly by compressed fluid, until normal operation becomes possible through freeing of the steel. In the normal operation of the motor, the leak passage, other than to provide for partial filling of the throwing passage, will play no material part as its effect on the operating cycle of the motor is otherwise negligible.

In the illustrative embodiment of the invention shown in Figs. 10 to 13, inclusive, the motor structure is essentially the same as that above described with the main exception that the fluid distribution means is somewhat modified. In this construction, the motor cylinder 65 has a bore 66 containing a reciprocatory hammer piston 67. The motor cylinder has a rear cylinder head 68 and a front cylinder head 69. Arranged in axial alinement with the cylinder bore, at the rear end of the latter, is an enlarged bore 70, and the rear cylinder head is of cylindric shape to fit this bore. Also arranged in the bore 70 is a cylindric valve box 71 having a cylindric valve box cover 72 abutting its rear face. A ratchet ring 73 is also arranged in the bore 70 at the rear of the valve box cover in abutting relation with the latter, and abutting the ratchet ring within the bore 70 is a cylindric member 74. A rear head block 75 abuts the rear face of the member 74 for clamping the parts 68, 71, 72 and 73 in position within the bore 70, and a dowel pin, similar to the dowel pin 17, is provided for holding the parts against rotation with respect to the cylinder. In this instance, the drill steel rotation mechanism is substantially similar to that above described and the rear end of the rifle bar 18 is journaled in a bore 76 in the member 74 and in a bore 77 in a sleeve like extension 78 integral with the rear cylinder head 68, this extension fitting tightly within a bore in the valve box cover 72 in the manner shown. The valve box 71 has alined end valve bores 79 and 80 connected by a reduced bore 81 in an intermediate partition 82. The walls of the bores 79, 80 and the exterior surface of the extension 78 provide the inner and outer walls of a pair of valve chambers, and the opposite surfaces of the partition 82 and the adjacent surfaces of the cylinder head and valve box cover provide the inner and outer end walls of the valve chambers. Arranged in the valve chambers is a pair of relatively movable, fluid actuated, fluid distributing valves 83 and 84, and, as in the form of the invention above described, these valves are arranged in telescopic relation and are adapted abuttingly to engage one another. Also as in the form of the invention above described, the valves are interchangeable and have like operating functions, so that it is immaterial in what end for end relation the valves are assembled. The valves 83 and 84 have sleevelike telescopically arranged body portions 85 and 86 respectively, the latter having formed externally thereon annular flanges 87 and 88 respectively slidingly fitting the valve box bores 79 and 80 and respectively having inwardly directed annular flanges 89 and 90. The larger sleevelike body portion of the valve 83 slidingly fits the intermediate reduced bore 81. The internal valve flanges 89 and 90 cooperate respectively with a cylindric projection 91 formed on the exterior of the extension 78 and a cylindric projection 92 formed on the valve box cover, thereby to provide restricted clearance spaces 93 and 94 for metering the flow of pressure fluid past the valves to the opposite ends of the cylinder bore. Formed in the front face of the valve box cover is an annular recess 95 connected by ports 96 with distributing passages 97, the latter in turn being connected by ports 98 with the front end of the cylinder bore. Passages 99 in the rear cylinder head connect the valve box bore 79 at the front side of the front valve 83 with the rear end of the cylinder bore.

The means for supplying pressure fluid to the valve chambers comprises a throttle valve 100 arranged in a transverse bore in the rear head block 75 and having an internal fluid supply chamber connected by a port 101 with a passage 102 in turn communicating with a chamber 103 in the member 74. Pressure fluid may be conducted from the chamber 103 through passages 104 and through the ratchet ring to an annular recess 105 formed in the rear face of the valve box cover. The recess 105 is connected by a passage 106 to an internal annular groove 107, the latter in turn connected with an annular passage 108 surrounding the rear head extension and formed within the cylindric projection 92. The passage 108 communicates directly with the fluid supply chamber within the valves. A pair of throwing passages 109 and 110 respectively communicate through ports 111 and 112 with the valve box bores 79 and 80 at the inner sides of the external valve flanges 87 and 88, and these throwing passages are connected by ports 113 and 114, respectively, with the cylinder bore at longitudinally spaced points. An annular exhaust groove 115 is formed in the walls of the cylinder bore substantially midway between the ends of the cylinder bore and between the ports 113 and 114, and this groove is connected directly to atmosphere through an exhaust port 116.

The mode of operation of this embodiment of the invention is generaly similar to that above described with the main exception that the valves are independently thrown by pressure fluid conducted thereto through separate piston-controlled throwing passages. When the parts are in the position shown in Fig. 10, pressure fluid may flow from the throttle valve 100, through port 101, passage 102, chamber 103, passages 104, through the spaces between the teeth of the ratchet ring 73 and thence through the recess 105, passages 106, groove 107 and passage 108 to the fluid supply chamber within the valves 83 and 84. Pressure fluid may then flow through the restricted clearance space 94, through the valve box bore 80 past the rear face of the rear valve 84, and through groove 95, ports 96, passages 97 and ports 98 to the front end of the cylinder bore at the front side of the piston head of the motor piston, the pressure fluid acting on the front pressure area of the piston head to move the motor piston rearwardly to effect its return stroke. Concurrently, the rear end of the cylinder bore at the rear side of the piston head and the valve box bore 79 at the rear side of the external valve flange of the front valve 83, are connected to exhaust through the exhaust groove 115. The rear valve 84 is held in its forward position by the pressure fluid acting on the effective rear pressure area of the valve and the rear valve, due to its abutting relation with the front valve 83, holds the latter in its closed position against the rear face of the rear cylinder head 68, all in the manner described above in the form shown in Fig. 1. As the motor piston moves rearwardly, the leading edge of the piston head first overruns the exhaust groove 115, cutting off communication of the rear end of the cylinder bore with the exhaust, and upon continued rearward piston movement, the leading edge of the piston head overruns the port 113 and thereafter the following edge of the piston head uncovers the port 114, admitting pressure fluid from the front end of the cylinder bore through the throwing passage 110 and port 112 to the valve box bore 80 at the forward side of the external flange 88 of the rear valve 84, to throw immediately the latter rearwardly from the position shown in Fig. 10 to its position shown in Fig. 11, likewise in a manner clearly described above. When the valve 84 is in its rearmost position, the annular seating surface at the rear end of its sleevelike body portion seats against the front face of the valve box cover while the front valve 83 is maintained seated against the rear face of the rear cylinder head. Accordingly, when the valves are in the position shown in Fig. 11, flow of pressure fluid to the motor cylinder is momentarily completely cut off, and as the motor piston continues to move rearwardly by momentum, the pressure fluid trapped within the rear end of the cylinder bore is compressed, and when the following edge of the piston head uncovers the exhaust groove 115 and rearward piston movement continues, the compression pressure built up by the piston within the rear end of the cylinder bore acts on the effective front pressure area of the external flange 87 of the front valve 83 to throw the latter rearwardly from the position shown in Fig. 11 to the position shown in Fig. 12, wherein the front valve abuttingly engages the rear valve. When the front end of the cylinder bore is connected to exhaust, the pressure in the valve box bore 80 at the forward side of the external flange 88 of the rear valve 84, is exhausted through the passage 110. When the parts are in the position shown in Fig. 12, in which, it will be noted, the pressure to the rear of the forward valve flange 87 is vented to exhaust, pressure fluid may flow from the supply chamber within the valves 83, 84, through the restricted clearance space 93, through the valve box bore 79, past the front face of the front valve and through the passages 99 to the rear end of the cylinder bore at the rear side of the piston head of the motor piston. Concurrently, the front end of the cylinder bore at the front side of the piston head and the valve box bores at the inner sides of the external flanges 87, 88 of the valves are connected to exhaust through the exhaust groove 115. The pressure fluid flowing past the front face of the front valve holds the latter in its rearmost position in abutting engagement with the rear valve and thereby maintains the rear valve in seated position against the front face of the valve box cover, as is clearly described above. Pressure fluid flowing through the passages 99 to the rear end of the cylinder bore acts on the rear pressure area of the piston head to move the motor piston forwardly to effect its working stroke. As the motor piston moves forwardly from the position shown in Fig. 12, the leading edge of the piston head first overruns the port 113 and thereafter overruns the exhaust groove 115 and the port 114, and upon continued forward piston movement, the following edge of the piston head uncovers the port 113 of the throwing passage 109, admitting pressure fluid from the rear end of the cylinder bore through the throwing passage 109 and port 111 to the valve box bore 79 at the rear side of the external flange 87 of the front valve 83, and as a result the pressure fluid acts on the effective pressure area of the external valve flange to throw immediately the front valve forwardly from the position shown in Fig. 12 to its position shown in Fig. 11, as is also clearly described above in the form shown in Fig. 1. When the front valve 83 reaches its foremost position, the annular end seating surface at the front end of the sleevelike body portion seats against the rear face of the rear cylinder head 68, while the rear valve 84 is still momentarily maintained seated against the front face of the valve box cover. Accordingly, when the valves are in the position shown in Fig. 11, flow of pressure fluid to the cylinder bore is momentarily cut off. However, the motor piston will continue to move forwardly by momentum, the pressure fluid trapped in the forward end of the cylinder bore will be compressed by the piston, and this compression pressure will act through ports 98, passages 97, ports 96 and groove 95 on the effective rear pressure area of the external flange 88 of the rear valve 84 to throw immediately the latter from the position shown in Fig. 11 to its position shown in Fig. 10. As the motor piston continues to move forwardly from the position of Fig. 11, the following edge of the piston head quickly uncovers the exhaust groove 115 to connect the rear end of the cylinder bore and the valve box bore 79 at the rear side of the external flange of the front valve, to exhaust. When the rear valve is in its position shown in Fig. 10, pressure fluid is again admitted to the front end of the cylinder and the cycle of operations above described is repeated.

It will be evident that by the provision of the separate valve chambers for receiving the external flanges of the valves and the separate throwing passages for admitting pressure fluid from the cylinder bore to the pressure areas on the external valve flanges, a very positive throwing action of the valves is obtained.

In the illustrative embodiment of the invention shown in Fig. 14, the construction is similar to that shown in Figure 1 with the exception that the valves are in alined end-abutting relation instead of the telescopic relation shown in Fig. 10; and this modified construction makes still clearer the increase in holding pressure areas when the valves move apart. In this construction, the rear cylinder head 120 is integral with a valve box 121, and the latter has a bore 122 closed at its rear end by a valve box cover 123. An inner sleeve 124 surrounds the rifle bar 18 and has its forward cylindric portion tightly fitted within a bore in the rear cylinder head, and this sleeve at its rear end abuts tightly the front face of the valve box cover. The sleeve 124 has an external annular flange 125 projecting within the valve box bore and provides an intermediate partition for partially dividing the valve box bore into a pair of chambers. Arranged in these valve chambers is a pair of cooperating, relatively movable, fluid distributing valves 126 and 127 of identical design and shape. As in the embodiments of the invention above described, these valves have like operating functions and are interchangeable end for end in the valve chambers without affecting their proper functioning. These valves have alined sleevelike body portions 128 and 129, respectively, provided with external annular flanges 130 and 131 slidingly fitting the valve box bore, and internal annular flanges 132 and 133. The sleevelike body portions of the valves slidingly fit over the periphery of the external flange 125 on the sleeve 124, in the manner shown. Pressure fluid may be supplied to the valve chambers in a manner similar to that shown in Fig. 1, and the pressure fluid may flow through the space between the teeth of the ratchet ring to a chamber 134 formed in the rear side of the valve box cover. The chamber 134 is connected by passages 135 in the valve box cover to passages 136 formed in the sleeve 124, the passages 136 in turn being connected by ports 137 with the valve chambers within the valves. The internal flanges 132 and 133 of the valves cooperate with the exterior cylindric surface of the sleeve 124 to provide restricted clearance spaces 138 and 139 for metering the flow of fluid past the internal valve flanges to the valve chambers at the remote sides of the valve. The mode of operation of this embodiment of the invention is similar to that of the embodiment shown in Fig. 10, above described. When the rear valve is in the position shown in Fig. 14, the rear end of the cylinder bore and the annular space between the external valve flanges are connected to exhaust through the exhaust groove 49, and pressure fluid may flow through the passages 136 and ports 137 to the chambers within the valves, the pressure fluid flowing through the restricted clearance space 139 through the valve box bore at the rear side of the rear valve and thence through ports 41, passages 42 and ports 43 to the front end of the cylinder bore at the front side of the piston head of the motor piston, the pressure fluid acting on the front effective area of the piston head to move the piston rearwardly to effect its return stroke. As the motor piston moves rearwardly, the leading edge of the piston head first covers the exhaust groove 49 and thereafter covers the port 47, and the pressure fluid trapped within the rear end of the cylinder bore is compressed by the piston. Upon continued rearward piston movement, the following edge of the piston head uncovers the port 48, admitting pressure fluid from the front end of the cylinder bore to the annular space between the external valve flanges, to throw immediately the rear valve into its rearmost position, cutting off the flow of pressure fluid to the forward end of the cylinder bore. Accordingly, the flow of pressure fluid to the cylinder is momentarily completely cut off by the valves and the piston continues to move rearwardly by momentum. Thereafter, the following edge of the piston head of the rearwardly moving piston uncovers the exhaust groove 49, connecting the forward end of the cylinder bore and the annular space between the external valve flanges to exhaust. As the piston continues to move rearwardly, the compression pressure built up in the rear end of the cylinder bore by the piston acts on the effective front pressure area of the front valve to throw the latter rearwardly from the position shown to its rearmost position into abutting engagement with the rear valve. When the front valve is in its rearmost position, pressure fluid may flow from the passages 136 and the front port 137 to the chamber within the front valve, the pressure fluid flowing through the restricted clearance space 138, through the valve box bore past the front face of the front valve and through passages 44 to the rear end of the cylinder bore at the rear side of the piston head of the motor piston, and acting on the rear pressure area of the piston head to drive the piston forwardly to effect its working stroke. As the piston moves forwardly, the leading edge of the piston head first covers the exhaust groove 49 and thereafter covers the port 48, and upon continued forward piston movement, the following edge of the piston head uncovers the port 47, admitting pressure fluid from the rear end of the cylinder bore through the throwing passage 46 and port 45 to the annular space between the external valve flanges to throw immediately the front valve into its position shown in Fig. 14. The piston continues to move forwardly under the expansive action of the pressure fluid and momentum, and when the following edge of the piston head uncovers the exhaust groove 49, the rear end of the cylinder bore and the annular space between the external valve flanges are connected to exhaust. The pressure fluid trapped in the front end of the cylinder bore is compressed by the piston, and this compression pressure acts through ports 43, passages 42 and ports 41 on the effective rear pressure area of the rear valve to throw the latter forwardly into its position shown in Fig. 14, and pressure fluid is again supplied to the front end of the cylinder bore and the cycle of operations above described is repeated.

In the modified embodiment of the invention shown in Fig. 15, the motor structure is essentially the same as that shown in Fig. 10 with the exception that the sleevelike bodies of the valves are in alined, end-abutting relation. In this construction, the valves are designated 140 and 141, respectively, and are identical in shape and design, and, as in the forms of the invention above described, have like operating functions and are interchangeable. These valves have alined sleevelike body portions 142 and 143, respectively, provided with external annular flanges 144 and 145 fitting the valve box bores and having inwardly directed annular flanges 146 and 147 which respectively cooperate with the cylindric projections on the rear cylinder head extension and valve box cover. The sleevelike body portions of the valve slidingly fit the bore in the partition between the valve box bores. The other details of the construction and the mode of operation of this embodiment of the invention are essentially the same as those described above in regard to the embodiment shown in Fig. 10, and therefore further description thereof is unnecessary. It should be noted, however, that when the valves are in their opposite extreme positions, the holding thereof is more positively effected by reason of the areas at the adjacent ends of the valve flanges 142 and 143, which are subjected then to valve chest pressure. In this feature, this species of Fig. 15 is different from the others; and with like valve areas slightly higher compression pressures to effect valve throwings in a port-opening direction will be called for. In the illustrative embodiment of the invention shown in Fig. 16, the structure is essentially the same as that shown in Fig. 10 with the exception that the fluid supply is disposed externally of the valves and the valve throwing pressure areas are arranged internally of the valves. In this construction, the cylinder has a rear cylinder head 150, a valve box 151 and a valve box cover 152. Surrounding the rifle bar 18 is a sleeve 153 having its cylindric end portions tightly fitted within bores in the rear cylinder head 150 and the valve box cover 152, and this sleeve has an external annular flange 154 projecting within a bore 155 in the valve box. Arranged in the valve box bore is a pair of cooperating relatively movable, fluid distributing valves 156 and 157 having sleevelike body portions 158 and 159, respectively, arranged in sliding telescopic relation, and the inner sleevelike body portion of the valve 156 slidingly engages the exterior periphery of the flange 154. Formed externally on these sleevelike body portions of the valves are external annular flanges 160 and 161 which cooperate with the bore 155 of the valve box to provide restricted clearance spaces 162 and 163. The sleevelike body portions of the valves also have inwardly directed annular flanges 164 and 165 respectively slidingly engaging at their peripheries the exterior surface of the sleeve 153, thereby to provide chambers within the valves. Pressure fluid may be supplied to the valve box bore in a manner similar to that shown in Fig. 10, and in this instance a port 166 communicates with the interior of the ratchet ring 73 and is connected by a passage 167 to a port 168 communicating with the valve box bore. A throwing passage 169 is connected by a passage 170 in the rear cylinder head and a communicating passage 171 in the sleeve 153 with the chamber within the front valve 156 at the rear side of the internal valve flange, and this throwing passage communicates through a port 172 with the cylinder bore slightly in advance of the exhaust groove 115. A throwing passage 173 is connected through a passage 174 in the valve box cover and a communicating passage 175 in the sleeve 153 with the chamber within the rear valve at the rear side of the internal valve flange, and the passage 173 is connected by a port 176 with the cylinder bore at a point forwardly of the exhaust groove 115.

The mode of operation of this form of the invention is generally similar to those of the embodiments of the invention above described. When the parts are in the position shown in Fig. 16, pressure fluid may flow from the interior of the ratchet ring 73 through port 166, passage 167 and port 168 to the valve box bore 155. Pressure fluid flows from the valve box bore through the restricted clearance space 163, past the external flange 161 of the rear valve, through the valve box bore, past the rear face of the rear valve and through groove 95, ports 96, passages 97 and ports 98 to the front end of the cylinder bore at the front side of the piston head of the motor piston, the pressure fluid acting on the front pressure area of the piston head to move the piston rearwardly to effect its return stroke. As the piston moves rearwardly, the leading edge of the piston head first overruns the exhaust groove 115 and thereafter overruns the port 172, and upon continued rearward piston movement, the following edge of the piston head uncovers the port 176, admitting pressure fluid from the front end of the cylinder bore through the throwing passage 173 and passages 174 and 175 to the chamber within the rear valve at the front side of the internal valve flange 165, to throw the rear valve rearwardly from the position shown in Fig. 16 to its closed position. The piston continues to move rearwardly by momentum and the fluid trapped within the rear end of the cylinder is compressed by the piston. As the piston continues to move rearwardly, the following edge of the piston head uncovers the exhaust groove 115 connecting the front end of the cylinder bore to exhaust, and thereafter the port 172 is uncovered by the following edge of the piston head, connecting the pressure area at the rear side of the internal flange 164 of the front valve to exhaust, and the compression pressure in the rear end of the cylinder bore then acts on the effective front pressure area of the front valve to throw the latter rearwardly from the position shown in Fig. 16 into its open position. At that time, the front valve abuts the rear valve to maintain the latter in its rearmost closed position. Pressure fluid then flows from the valve box bore 155 through the restricted clearance space 162, past the external flange 160 of the front valve, through the valve box bore past the front face of the front valve and through the passages 99 to the rear end of the cylinder bore at the rear side of the motor piston, the pressure fluid acting on the rear pressure area of the piston head to move the piston forwardly to effect its working stroke. As the piston moves forwardly, the leading edge of the piston head first overruns the exhaust groove 115 and thereafter closes the port 176, and upon continued forward piston movement, the following edge of the piston head uncovers the port 172, admitting pressure fluid from the rear end of the cylinder bore through the throwing passage 169 and passages 170 and 171 to the chamber within the front valve at the rear side of the internal valve flange 164, and as a result, the front valve is thrown forwardly into its closed position shown in Fig. 16. As the piston continues to move forwardly, the fluid trapped within the front end of the cylinder bore is compressed by the piston, and upon continued forward piston movement, the following edge of the piston head uncovers the port 172, and thereafter uncovers the exhaust groove 115, connecting the rear end of the cylinder bore to exhaust and exhausting the fluid in the chamber within the front valve at the rear side of the internal valve flange 164. The compression pressure built up within the front end of the cylinder bore by the forwardly moving piston acts through the ports 98, passages 97 and ports 96 on the effective rear pressure area of the rear valve to throw the latter forwardly into its open position shown in Fig. 16, again admitting pressure fluid to the front end of the cylinder bore, and the cycle of operations above described is repeated.

As a result of this invention, it will be noted that an improved pressure fluid motor is provided having improved fluid distribution means whereby the pressure fluid is distributed to the motor cylinder passages in a novel and more effective manner. It will further be evident that by the provision of the improved fluid distributing valve means embodying cooperating, relatively movable, fluid distributing valves for controlling the flow of pressure fluid to the motor cylinder, not only are the efficiency and smoothness of operation of the motor greatly improved, but a more powerful hammer blow is attained. It will further be noted that by the provision of the novel valve design embodying valves having like operating functions, reversal of the multivalve units is possible, thereby preventing improper assembling of the valves. Also, by the provision of the improved valve throwing means, the valves are moved into their different operating positions in an improved and more positive manner. Other uses and advantages of the invention will be clearly apparent to those skilled in the art.

It is to be understood that I have used the term "interchangeable" throughout the specification and claims not only to include that relation which subsists between the valves of Figs. 14 and 15, in which the valves are exact duplicates, so that either can be replaced by a duplicate of the other; but also to include that relation between the valves which subsists in the structures of the first and of the last species of the invention shown in the drawings, to wit: an arrangement in which either valve may perform the function of the other provided the other concurrently performs the function of the first—in other words, an arrangement in which, although the valves are not mutually identical, they can, when correctly brought together, be installed with either valve at a given end of the valve chest, and operate satisfactorily.

While there are in this application specifically described several forms which the invention may assume in practice, it will be understood that these forms are shown for purposes of illustration, and that the invention may be modified and embodied in various other forms without departing from its spirit or the scope of the appended claims.

What I claim as new and desire to secure by Letters Patent is:

1. In a pressure fluid motor, the combination comprising a cylinder, a piston reciprocable in said cylinder, and fluid distribution means for the motor including means providing a pair of communicating valve chambers, passages leading from said valve chambers respectively to the opposite ends of said cylinder, a pressure fluid supply, a pair of cooperating valves arranged in said valve chambers, said valves being relatively movable and adapted to abut one another in certain positions of said valves, said valves controlling the flow of pressure fluid from said fluid supply to said passages, and means communicating with said valve chambers respectively and controlled by said piston for subjecting said valves to valve throwing pressures independently to throw said valves into their different operating positions.

2. In a pressure fluid motor, the combination comprising a cylinder, a piston reciprocable in said cylinder, and fluid distribution means for the motor including means providing a valve chamber, passages leading from said valve chamber respectively to the opposite ends of said cylinder, a pressure fluid supply, a pair of cooperating valves arranged in said valve chamber and having like operating functions and being interchangeable without affecting their operating functions, said valves being relatively movable and adapted to exert pressures to hold one another stationary in certain positions of said valves, said valves controlling the flow of pressure fluid from said fluid supply to said passages, and means controlled by said piston for subjecting said valves to valve throwing pressures to throw said valves into their different operating positions, each of said valves having a surface thereon subjected by fluid flowing past the same when it is open, to a pressure tending to close said valve.

3. In a pressure fluid motor, the combination comprising a cylinder, a piston reciprocable in said cylinder, fluid distribution means for the motor including means providing a valve chamber, passages leading from said valve chamber respectively to the opposite ends of said cylinder, a pair of valves arranged in said valve chamber and movable relative to each other in said valve chamber, said valves having like operating functions and being interchangeable without affecting their operating functions, an internal fluid supply chamber arranged within said valves, said valves controlling the flow of pressure fluid from said supply chamber to said passages, and means for subjecting said valves to valve throwing pressures for throwing said valves into their different operating positions including surfaces on each of said valves cooperating in the formation of a space to which fluid is delivered to effect valve closure, and means under the control of said piston for delivering fluid to and venting fluid from said space.

4. In a pressure fluid motor, the combination comprising a cylinder, a piston reciprocable in said cylinder, fluid distribution means for the motor including means providing a valve chamber, passages leading from said valve chamber respectively to the opposite ends of said cylinder, a pair of valves arranged in said valve chamber and movable relative to each other in said valve chamber, said valves having like operating functions, an internal fluid supply chamber arranged within said valves, said valves controlling the flow of pressure fluid from said supply chamber to said passages, and means for subjecting said valves to valve throwing pressures for throwing said valves into their different operating positions including surfaces on each of said valves cooperating in the formation of a space to which fluid is delivered to effect valve closure, means under the control of said piston for delivering fluid to and venting fluid from said space, and means for admitting a continuous restricted flow of pressure fluid to said space during operation of the motor.

5. In a pressure fluid motor, the combination comprising a cylinder, a piston reciprocable in said cylinder, and fluid distribution means for the motor including means providing a valve chamber, passages leading from said valve chamber respectively to the opposite ends of said cylinder, a pair of cooperating valves arranged in said valve chamber and movable relative to each other in said valve chamber and having like operating functions and being interchangeable without affecting their operating functions, said valves having means cooperating with said valve-chamber-providing-means to provide internally of said valves a chamber sealed, when said valves are closed, from communication with the cylinder through said passages, and means for delivering motive fluid to said internal chamber for distribution therefrom under the control of said valves through said passages to said cylinder.

6. A pressure fluid motor comprising, in combination, a cylinder, a piston reciprocable in said cylinder, and fluid distribution means for the motor including passage means for supplying operating fluid to the opposite ends of said cylinder at the opposite sides of said piston respectively, an operating fluid supply, valve means including a pair of cooperating, relatively movable valves having like operating functions and being interchangeable without affecting their operating functions, said valves being movable into abutting engagement and respectively controlling the flow of operating fluid to the opposite ends of said cylinder, for controlling the communication of said passage means with said fluid supply, and valve throwing means for subjecting said valves to valve throwing pressures to move said valves into their different operating positions, said valve throwing means including surfaces on said valves subjected by fluid flowing past said valves when the latter are in open position, to pressures tending to close said valves, one of said valves being held in one position by said other valve abuttingly engaging the same, and said valves in certain positions thereof momentarily concurrently completely cutting off communication of both of said passage means with said fluid supply.

7. A pressure fluid motor comprising, in combination, a cylinder, a piston reciprocable in said cylinder, and fluid distribution means for the motor including passage means for supplying operating fluid to the opposite ends of said cylinder at the opposite ends of said piston respectively, an operating fluid supply, valve means including a pair of cooperating, relatively movable valves having like operating functions and being interchangeable without affecting their operating functions, said valves being movable into abutting engagement and respectively controlling the flow of operating fluid to the opposite ends of said cylinder, for controlling the communication of said passage means with said fluid supply, and valve throwing means for subjecting said valves to valve throwing pressures to move said valves into their different operating positions, said valve throwing means including surfaces on said valves subjected by fluid flowing past said valves when the latter are in open position to pressures tending to close said valves, one of said valves being held in one position by said other valve abuttingly engaging the same, and said valves when in positions wherein they are out of abutting engagement momentarily concurrently completely cutting off communication of both of said passage means with said fluid supply.

8. A pressure fluid motor comprising, in combination, a cylinder, a piston reciprocable in said cylinder, and fluid distribution means for the motor including passage means for supplying operating fluid to the opposite ends of said cylinder at the opposite ends of said piston respectively, an operating fluid supply, valve means including a pair of cooperating, relatively movable valves having like operating functions and being interchangeable without affecting their operating functions, said valves respectively controlling the communication of said passage means with said fluid supply and thereby controlling the flow of operating fluid to the opposite ends of said cylinder, and valve throwing means for subjecting said valves to valve throwing pressures to move said valves into their different operating positions, said valve throwing means including portions on at least one of said valves subjected by fluid flowing past said valve to the cylinder, to a force tending to sweep said valve to its closed position, and said valves being movable toward and from one another and when in their remote positions, momentarily concurrently completely cutting off communication of both of said passage means with said fluid supply.

9. A pressure fluid motor comprising, in combination, a cylinder, a piston reciprocable in said cylinder, and fluid distribution means for the motor including passage means for supplying operating fluid to the opposite ends of said cylinder at the opposite ends of said piston respectively, an operating fluid supply, valve means including a pair of cooperating, relatively movable valves having like operating functions and being interchangeable without affecting their operating functions, said valves being movable into abutting engagement and respectively controlling the communication of said passage means with said fluid supply and thereby controlling the flow of operating fluid to the opposite ends of said cylinder, and valve throwing means for subjecting said valves to valve throwing pressures to move said valves into their different operating positions, said valve throwing means including surfaces on said valves subjected by fluid flowing past said valves when the latter are in open position, to pressures tending to close said valves, and said valves being movable toward one another into abutting engagement and from one another out of abutting engagement and when in their positions away from one another out of abutting engagement momentarily concurrently completely cutting off communication of both of said passage means with said fluid supply.

10. In a pressure fluid motor, the combination comprising a cylinder having a bore, a piston reciprocable in said cylinder bore, and fluid distribution means for supplying pressure fluid to and exhausting fluid from said cylinder bore to effect reciprocation of said piston comprising means providing a pair of communicating valve chambers, a pair of relatively movable, fluid distributing valves having external flanges respectively slidingly fitting said valve chambers, means for effecting movement of said valves relative to one another into their different operating positions in said valve chambers including means each individual to one of said valves for subjecting the inner adjacent sides of said valve flanges in turn to valve throwing pressures, and means providing fluid supply passages communicating with the ends of said valve chambers respectively at the remote sides of said valve flanges for conducting pressure fluid to the opposite ends of said cylinder bore, said valves respectively controlling the flow of pressure fluid through the remote ends of said valve chambers past the remote sides of said valve flanges to said supply passages.

11. In a pressure fluid motor, the combination comprising a cylinder having a bore, a piston reciprocable in said cylinder bore, and fluid distribution means for supplying pressure fluid to and exhausting fluid from said cylinder bore to effect reciprocation of said piston comprising means providing a pair of communicating valve chambers having a partial partition between them, cooperating, relatively movable, fluid distributing valves each having a sleevelike body portion, said body portions arranged in axial alinement and each valve having an annular flange formed externally on the sleevelike body portion thereof, said valve flanges respectively slidingly fitting said valve chambers, means for effecting movement of said valves relative to one another into their different operating positions in said valve chambers including means for subjecting the inner adjacent sides of said valve flanges to valve throwing pressures, and means providing fluid supply passages communicating with the ends of said valve chambers respectively at the remote sides of said valve flanges for conducting pressure fluid to the opposite ends of said cylinder bore, said valves respectively controlling the flow of pressure fluid through the remote ends of said valve chambers past the remote sides of said valve flanges to said supply passages.

12. In a pressure fluid motor, the combination comprising a cylinder having a bore, a piston reciprocable in said cylinder bore, and fluid distribution means for supplying pressure fluid to and exhausting fluid from said cylinder bore to effect reciprocation of said piston comprising means providing a pair of communicating valve chambers, a pair of cooperating, relatively movable, fluid distributing valves reciprocably mounted in said valve chambers respectively and of identical shape and design, said valves having like operating functions and being interchangeable without affecting their operating functions, said valves movable into and out of positions in which they exert pressures to hold one another stationary, one valve controlling the flow of pressure fluid to one end of said cylinder bore and the other valve controlling the flow of pressure fluid to the opposite end of said cylinder bore, means for controlling the movement of said valves relative to one another into their different operating positions in said valve chambers, said last mentioned means including, upon each of said valves, a surface subjected by fluid flowing past said valve when the latter is open, to a pressure tending to close said valve, a pressure fluid supply, and means providing supply passages for conducting pressure fluid from the remote ends of said valve chambers respectively to the opposite ends of said cylinder bore, said valves respectively controlling the flow of pressure fluid from said fluid supply through the remote ends of said valve chambers to said supply passages.

13. In a pressure fluid motor, the combination comprising a cylinder having a bore, a piston reciprocable in said cylinder bore, and fluid distribution means for supplying pressure fluid to and exhausting fluid from said cylinder bore to effect reciprocation of said piston comprising means providing a pair of communicating valve chambers, a pair of cooperating, relatively movable, fluid distributing valves reciprocably mounted in said valve chambers respectively and of identical shape and design, said valves having like operating functions and being interchangeable without affecting their operating functions, said valves movable into and out of abutting relation, one valve controlling the flow of pressure fluid to one end of said cylinder bore and the other valve controlling the flow of pressure fluid to the opposite end of said cylinder bore, means for controlling the movement of said valves relative to one another into their different operating positions in said valve chambers, a pressure fluid supply, means cooperating with said valves respectively for providing a metered flow of pressure fluid from said fluid supply to the remote ends of said valve chambers, and means providing fluid supply passages for conducting pressure fluid from the remote ends of said valve chambers respectively to the opposite ends of said cylinder bore, said valves respectively controlling the flow of pressure fluid from said fluid supply past said metering means and through the remote ends of said valve chambers to said supply passages.

14. A pressure fluid motor comprising, in combination, a cylinder, a piston reciprocable therein, fluid distribution means for the motor including passage means for supplying operating fluid to the opposite ends of said cylinder at the opposite sides of said piston respectively, an operating fluid supply, valve means including a pair of cooperating, relatively movable valves having like operating functions and interchangeable end for end without affecting their operating functions, said valves movable into abutting relation and respectively controlling the communication of said passage means with the fluid supply and thereby controlling the flow of operating fluid to the opposite ends of said cylinder, means cooperating with said valves providing metered flow of operating fluid from said fluid supply to said passage means, said valves of said valve means in certain positions thereof momentarily concurrently completely cutting off communication of both of said passage means with said fluid supply.

15. In a pressure fluid motor, the combination comprising a cylinder having a bore, a piston reciprocable in said cylinder bore, and fluid distribution means for supplying pressure fluid to and exhausting fluid from said cylinder bore to effect reciprocation of said piston comprising means providing a valve chamber, a pair of cooperating, relatively movable, fluid distributing valves movably mounted in said valve chamber, said valves having like operating functions and being interchangeable end for end without affecting their operating functions, means for effecting movement of said valves relative to one another into their different operating positions in said valve chamber, means cooperating with said valves providing an internal fluid supply chamber within said valves, and means providing fluid supply passages connecting the opposite ends of said valve chamber at the remote sides of said valves respectively to the opposite ends of said cylinder bore, said valves respectively controlling the flow of pressure fluid from said internal fluid supply chamber through the opposite ends of said valve chamber to said supply passages.

16. In a pressure fluid motor, the combination comprising a cylinder having a bore, a piston reciprocable in said cylinder bore, and fluid distribution means for supplying pressure fluid to and exhausting fluid from said cylinder bore to effect reciprocation of said piston comprising means providing a valve chamber having a uniform bore and valve seating surfaces at its opposite ends, a pair of coaxial, relatively movable, fluid distributing valves reciprocably mounted in said valve chamber and having like operating functions and being interchangeable end for end without affecting their operating functions, said valves having sleevelike body portions and external flanges surrounding said body portions and slidingly fitting said valve chamber bore, said sleevelike body portions of said valves at their remote ends having valve seat surfaces respectively adapted to seat against said valve seating surfaces, means for effecting movement of said valves relative to one another into their different operating positions in said valve chamber, and means providing fluid supply passages leading from the opposite ends of said valve chamber respectively to the opposite ends of said cylinder bore, said valves respectively controlling the flow of pressure fluid through the opposite ends of said valve chamber to said supply passages.

17. In a pressure fluid motor, the combination comprising a cylinder having a bore, a piston reciprocable in said cylinder bore, and fluid distribution means for supplying pressure fluid to and exhausting fluid from said cylinder bore to effect reciprocation of said piston comprising means providing a valve chamber, cooperating, relatively movable, fluid distributing valves reciprocably mounted in said valve chamber and arranged in alined relation to each other and to have only end-abutting engagement with each other, means for effecting movement of said valves relative to one another into their different operating positions in said valve chamber, means cooperating with said valves respectively providing metering spaces through which fluid must flow to the opposite ends of said valve chamber, and means providing fluid supply passages for connecting the opposite ends of said valve chamber respectively with the opposite ends of said cylinder bore, said valves respectively controlling the flow of fluid past said metering spaces and through the opposite ends of said valve chamber to said supply passages.

18. In a pressure fluid motor, in combination, a cylinder having a bore, a piston reciprocable in said cylinder bore, and fluid distribution means for supplying pressure fluid to and exhausting fluid from said cylinder bore for effecting reciprocation of said piston comprising means providing a valve chamber, passage means providing fluid supply passages for connecting the opposite ends of said valve chamber with the opposite ends of said cylinder bore, and a pair of cooperating, relatively movable, fluid distributing valves having like operating functions and being interchangeable end for end without affecting their operating functions, said valves arranged in sliding telescopic relation and mounted in said valve chamber for respectively controlling fluid flow to said supply passages.

19. In a pressure fluid motor, in combination, a cylinder having a bore, a piston reciprocable in said cylinder bore, and fluid distribution means for supplying pressure fluid to and exhausting fluid from said cylinder bore for effecting reciprocation of said piston comprising means providing a valve chamber, and a pair of cooperating, relatively movable, fluid distributing valves having like operating functions and being interchangeable end for end without affecting their operating functions, said valves always engaging one another and cooperating to provide a space therebetween, means forming passages leading from said valve chamber to the opposite ends of said cylinder bore at the opposite ends of said piston respectively, said passages controlled by said valves respectively for conducting pressure fluid from said valve chamber to said cylinder bore, and throwing passage means communicating with the cylinder bore and controlled by said piston for conducting throwing pressure to the space between said valves.

20. In a pressure fluid motor, in combination, a cylinder having a bore, a piston reciprocable in said cylinder bore, and fluid distributing means for supplying pressure fluid to and exhausting fluid from said cylinder bore for effecting reciprocation of said piston comprising means providing a valve chamber, and a pair of cooperating, relatively movable, fluid distributing valves having like operating functions and being interchangeable end for end without affecting their operating functions, said valves always engaging one another and cooperating to provide a space therebetween, means forming passages leading from said valve chamber to the opposite ends of said cylinder bore at the opposite ends of said piston respectively, said passages controlled by said valves respectively for conducting pressure fluid from said valve chamber to said cylinder bore, throwing passage means communicating with the cylinder bore and controlled by said piston for conducting throwing pressure to the space between said valves, and means for supplying a continuous restricted flow of pressure fluid to said space during operation of the motor.

21. A pressure fluid motor comprising, in combination, a cylinder, a piston reciprocable in said cylinder, and fluid distribution means for said motor comprising means providing a valve chamber, passages leading from the opposite ends of said valve chamber respectively to the opposite ends of said cylinder, a pressure fluid supply, a pair of cooperating valves arranged in said valve chamber and each having a bore through it, said valves being relatively movable and adapted to abut one another in certain positions thereof, said fluid supply communicating with said valve chamber externally of said valves, said valves controlling the flow of pressure fluid from said external fluid supply to said passages, and means communicating with said valve chamber internally of said valves and controlled by said piston for subjecting said valves to valve throwing pressures to throw said valves into their different operating positions.

22. A pressure fluid motor comprising, in combination, a cylinder, a piston therein, and fluid distribution means for the motor including passage means for supplying operating fluid to the opposite ends of the cylinder at the opposite ends of the piston respectively, an operating fluid supply, valve means including a pair of cooperating, relatively movable valve elements respectively controlling the flow of operating fluid to the opposite ends of said cylinder for controlling the communication of said passage means with said fluid supply, said valve elements interchangeable with each other without affecting their operating functions, and valve throwing means for subjecting said valve elements to valve throwing pressures to move said valve elements into their different operating positions, said valve throwing means including for each of said valve elements means associated with the latter and subjected to a valve closing pressure by fluid flowing past said valve element to the cylinder and means subjected to a supplemental valve closing pressure controlled by the position of the motor piston, said valve elements being movable toward and from one another, each of said valves when in its full open position exerting a force for holding the other closed, and said valve elements movable to effect concurrently interruption of communication of each of said passage means with said fluid supply.

23. In a pressure fluid motor, the combination comprising a cylinder having a bore, a piston reciprocable in said cylinder bore, a valve chest providing a chamber, fluid distribution passages leading from said valve chamber to the opposite ends of said cylinder bore, valve means in said chamber for controlling the flow of motive fluid from said chamber to said distribution passages including relatively movable fluid distributing valve elements, each annular in end elevation and having a like minimum radial dimension to the other, said valve elements movable to positions in which they concurrently interrupt communication between said chamber and said fluid distribution passages and simultaneously cooperate in providing a partition which divides said chamber from end to end, and at one side of which partition both of said distribution passages open into the chamber, a source of operating fluid communicating with said chamber at a point separated by said partition, when the same is formed, from said fluid distribution passages, and means for the moving said valve elements into their different operating positions including passage means for delivering valve throwing fluid to said valve elements to act upon the same at the other side of said partition.

24. A pressure fluid motor comprising, in combination, a cylinder, a piston therein, and fluid distribution means for the motor including passage means for supplying operating fluid to the opposite ends of the cylinder at the opposite ends of the piston respectively, an operating fluid supply, valve means including a pair of cooperating, relatively movable valve elements respectively controlling the flow of operating fluid to the opposite ends of said cylinder for controlling the communication of said passage means with said fluid supply, and valve throwing means for subjecting said valve elements to valve throwing pressures to move said valve elements into their different operating positions including external and internal flanges on each of said valve elements respectively continuously and intermittently subjected to valve closing forces when said valve element is in open position, said valve elements being movable toward and from one another, each of said valve elements when in its full open position exerting a force for holding the other closed, and said valve elements movable to effect concurrently interruption of communication of each of said passage means with said fluid supply.

25. A pressure fluid motor comprising, in combination, a cylinder, a piston therein, and fluid distribution means for the motor including passage means for supplying operating fluid to the opposite ends of the cylinder at the opposite ends of the piston respectively, an operating fluid supply, valve means including a pair of cooperating, relatively movable valve elements respectively controlling the flow of operating fluid to the opposite ends of said cylinder for controlling the communication of said passage means with said fluid supply, and valve throwing means for subjecting said valve elements to valve throwing pressures to move said valve elements into their different operating positions including portions on each of said valve elements continuously subjected by fluid flowing past said valve elements to the cylinder to valve closing forces when said valve elements are in open position, and means providing oppositely facing pressure areas intermittently subjected, each independently of the other, to valve closing forces to supplement said first mentioned forces and close said valve elements in alternation, said valve elements being movable toward and from one another, each of said valve elements when in its full open position exerting a force for holding the other closed, and said valve elements movable to effect concurrently interruption of communication of each of said passage means with said fluid supply.

26. In a pressure fluid motor, the combination comprising a cylinder having a bore, a piston reciprocable in said cylinder bore, and fluid distribution means for supplying pressure fluid to and exhausting fluid from said cylinder bore to effect reciprocation of said piston comprising means providing a valve chest, a pair of cooperating, relatively movable, fluid distributing valves movably mounted in said valve chest for controlling the supply of pressure fluid to the opposite ends of said cylinder bore, said valves arranged in coaxial relation and being hollow and being interchangeable with each other without altering their operating functions, and the pressure fluid flowing to the rear end of said cylinder bore through both of said hollow valves, means for effecting movement of said valves relative to one another into their different normal operating positions in said valve chest, and means providing fluid supply passages leading from the opposite ends of said valve chest respectively to the opposite ends of said cylinder bore, said valves respectively controlling the flow of pressure fluid through the ends of said valve chest to said supply passages.

JOHN C. CURTIS.